United States Patent
Okamura et al.

(10) Patent No.: US 10,006,127 B2
(45) Date of Patent: Jun. 26, 2018

(54) METHOD FOR SUPPRESSING CORROSION IN PLANT AND PLANT

(75) Inventors: Masato Okamura, Yokohama (JP); Osamu Shibasaki, Yokohama (JP); Seiji Yamamoto, Tokyo (JP); Hajime Hirasawa, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 654 days.

(21) Appl. No.: 13/812,368

(22) PCT Filed: Jul. 26, 2011

(86) PCT No.: PCT/JP2011/066969
§ 371 (c)(1),
(2), (4) Date: Apr. 2, 2013

(87) PCT Pub. No.: WO2012/014894
PCT Pub. Date: Feb. 2, 2012

(65) Prior Publication Data
US 2013/0182814 A1 Jul. 18, 2013

(30) Foreign Application Priority Data
Jul. 27, 2010 (JP) .................. 2010-168289

(51) Int. Cl.
*G21C 9/00* (2006.01)
*C23C 26/00* (2006.01)
(Continued)

(52) U.S. Cl.
CPC .......... *C23C 26/00* (2013.01); *C23C 18/1216* (2013.01); *C23C 18/1241* (2013.01);
(Continued)

(58) Field of Classification Search
USPC ........................................... 376/305
See application file for complete search history.

(56) References Cited

U.S. PATENT DOCUMENTS 4,419,302 A * 12/1983 Nishino .................. F22B 1/284
122/487
5,608,766 A * 3/1997 Andresen ............... B01J 37/031
376/305
(Continued)

FOREIGN PATENT DOCUMENTS

CN 101779254 A 7/2010
DE 100 30 726 A1 4/2001
(Continued)

OTHER PUBLICATIONS

Lanthanide based conversion coatings to protect aluminum alloys S. M. Fernandes, O. V. Correa, J. A. de Souza, L. V. Ramanathan.*
(Continued)

*Primary Examiner* — Marshall P O'Connor
(74) *Attorney, Agent, or Firm* — Oblon, McClelland, Maier & Neustadt, L.L.P.

(57) ABSTRACT

In a plant including a system which is provided with a steam generator 2, a turbine 3, 5, a condenser 6 and a heater 7 and in which non-deaerated water circulates, and a pipe, the steam generator 2, the heater 7 and 8 of the system which comes into contact with the non-deaerated water is deposited with a protective substance.

4 Claims, 4 Drawing Sheets

(51) Int. Cl.
  *C23F 11/08* (2006.01)
  *C23F 11/18* (2006.01)
  *F28F 19/06* (2006.01)
  *F01K 21/06* (2006.01)
  *G21C 19/307* (2006.01)
  *C23C 18/12* (2006.01)
  *G21D 1/00* (2006.01)

(52) U.S. Cl.
  CPC .............. *C23F 11/08* (2013.01); *C23F 11/18* (2013.01); *C23F 11/185* (2013.01); *F01K 21/06* (2013.01); *F28F 19/06* (2013.01); *G21C 19/307* (2013.01); *G21D 1/00* (2013.01)

(56) References Cited

U.S. PATENT DOCUMENTS

| | | | |
|---|---|---|---|
| 5,774,516 A * | 6/1998 | Hettiarachchi | B01J 37/031 376/305 |
| 7,449,101 B2 | 11/2008 | Okamura et al. | |
| 2003/0180180 A1 | 9/2003 | Okamura et al. | |
| 2005/0265512 A1* | 12/2005 | Dulka et al. | 376/305 |
| 2006/0050833 A1 | 3/2006 | Ichikawa et al. | |
| 2006/0146975 A1 | 7/2006 | Okamura et al. | |

FOREIGN PATENT DOCUMENTS

| | | |
|---|---|---|
| JP | 10 339793 | 12/1998 |
| JP | 11 304993 | 11/1999 |
| JP | 2003 232886 | 8/2003 |
| JP | 2006 162522 | 6/2006 |
| JP | 2009 216289 | 9/2009 |

OTHER PUBLICATIONS

The Electrochemistry of Corrosion Edited by Gareth Hinds from the original work of J G N Thomas.*

"Chemistry of Titanium Dioxide in Steam Generators," Paine (1994).*

Combined Chinese Office Action and Search Report dated Jan. 7, 2015 in Patent Application No. 201180036521.7 (with English language translation).

English translation of the International Preliminary Report on Patentability dated Feb. 21, 2013 in PCT/JP2011/066969 filed Jul. 26, 2011.

English translation of the Written Opinion of the International Searching Authority dated Sep. 13, 2011 in PCT/JP2011/066969 filed Jul. 26, 2011.

International Search Report dated Sep. 13, 2011 in PCT/JP11/66969 Filed Jul. 27, 2011.

Extended European Search Report dated Jun. 1, 2015 in Patent Application No. 11812483.3.

Office Action dated Apr. 26, 2016, issued in the UAE Patent Application 0086/2013.

* cited by examiner

METHOD FOR SUPPRESSING CORROSION IN PLANT AND PLANT

TECHNICAL FIELD

The present invention relates to a method for suppressing corrosion of pipes, devices, machineries, and the like that constitute a plant and also relates to a plant.

BACKGROUND TECHNOLOGY

A thermal power plant and a nuclear power plant generally provided with a system which drives a turbine with steam generated by a steam generator and returns condensate water to the steam generator. Since, pipes and/or devices of such system may be damaged due to corrosion during operation, countermeasures to such damage have been taken for reducing the corrosion.

For example, in secondary systems of current pressurized water nuclear power plants, such countermeasures as makeup water management and management of water treatment chemicals are being taken for preventing infiltration of impurities into the system in order to prevent corrosion troubles in steam generators and turbines. In order to suppress corrosion of devices and pipes that constitute a system, countermeasures are taken to obtain a deoxidized and reducing atmosphere by pH control with use of pH adjusters and injection of hydrazine. Furthermore, various other countermeasures or procedures have been taken, such as installation of a desalting device and the proper operation thereof for removing infiltrated impurities out of the system, installation of a clean-up system and a steam generator blowdown collection system, and installation of a deaerator for reducing dissolved oxygen.

The deaerator is placed to deaerate circulating water of the system and to reduce oxygen from transferring to the steam generator. The deaerator acts to suppress increase in corrosion potential of structural members due to oxygen contribution. As oxygen concentration increases, cracking such as intergranular corrosion cracking and stress corrosion cracking occurs due to the potential increase.

Meanwhile, elution of metal ions from pipes and the like is a typical phenomenon that occurs in high temperature hot water. Elution of metal ions causes operational problems attributed to corrosion of structural members as well as pipes and other members, and exerts various influences such as increase in frequency of maintenance. Moreover, eluted metal ions are deposited and crystallized as an oxide at high temperature portions in the system, such as pipe surfaces and the steam generator, which causes a phenomenon of corrosion cracking due to potential increase. Since the adhering oxide causes deterioration in heat transfer, the oxide needs to be removed on a periodic basis by chemical cleaning.

Thus, such phenomena as metal elution and corrosion may gradually be accumulated during a long-term plant operation or running and may possibly cause disaster at some point without notice. In order to obviate such phenomena, chemicals such as ammonia and hydrazine are injected for pH control to implement deaeration so as to reduce iron elution from the system as a countermeasure to prevent inflow of iron into the steam generator.

In order to eliminate alkali concentration in a clevis portion, various suggestions have been made for water quality control, such as chloride ion concentration management and dissolved oxygen concentration control.

PRIOR ART DOCUMENT

Patent Document

Patent Document 1: Japanese Patent Laid-Open Publication No. 2010-96534
Patent Document 2: Japanese Patent No. 3492144

DESCRIPTION OF INVENTION

Problems to be Solved by Invention

As described in the forgoing, conventional corrosion suppressing methods not only need various devices such as a deaerator and chemical injection and control devices for suppression of corrosion, but also require execution of chemical concentration control and strict water chemistry control. Consequently, equipment is enlarged and operation control is complicated, which causes increase in equipment costs and operating costs of the plants.

The present invention has been made in consideration of the circumstances mentioned above, and an object thereof is to provide a method for suppressing corrosion in a plant and a plant in which a structural member of a system having a steam generator and a turbine is deposited with a protective substance so as to achieve reduction in equipment costs and running costs.

Means for Solving Problem

In order to solve the problem in the conventional art mentioned above, the present invention provides a method for suppressing corrosion in a plant including a system which is provided with a steam generator, a turbine, a condenser and a heater and in which non-deaerated water circulates, wherein depositing a structural member of the system which comes into contact with the non-deaerated water with a protective substance.

Effect of Invention

In the method for suppressing corrosion in a plant and the plant according to the present invention, equipment costs and running or operating costs of the plant can be reduced.

MODES FOR EMBODYING INVENTION

Hereunder, an embodiment of the present invention will be described with reference to the accompanying drawings.
(Constitution)

An example in which a method for suppressing corrosion of the present embodiment which is applied to a secondary system of a pressurized water nuclear power plant will be explained with reference to FIGS. 1 through 7.

Figure 1:
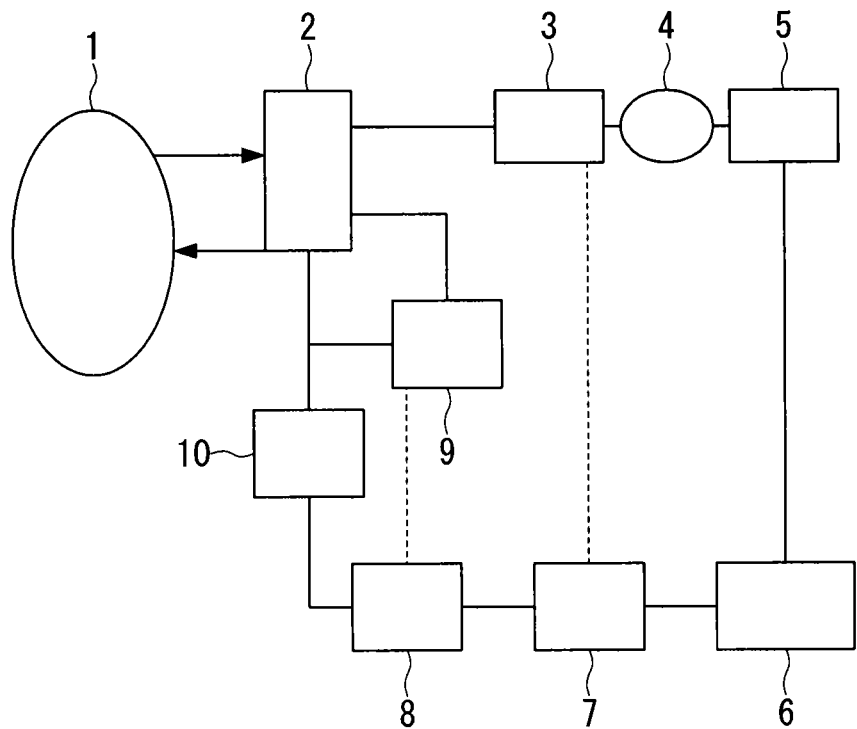
FIG. 1 is a schematic view showing a secondary system of a plant according to the present embodiment.

As shown in FIG. 1, the secondary system includes a nuclear reactor 1, a steam generator 2, a high pressure turbine 3, moisture content separation heater 4, a low pressure turbine 5, a condenser 6, a low pressure heater 7, a high pressure heater 8, a high temperature desalting device (purification equipment) 9, and a high temperature filter (purification equipment) 10. The condenser 6 may include a condenser unit having a low-temperature purification device (desalting device+filter) provided in the downstream side of the condenser 6.

Since the secondary system of the structure mentioned above, is not provided with a deaerator provided in the secondary system of the conventional pressurized water nuclear power plant, non-deaerated water circulates inside the secondary system. The non-deaerated water is the circulating water which is neither subjected to deaeration processing by a deaerator nor subjected to injection of chemicals such as hydrazine for deaeration by a chemical injection device.

In the present embodiment, surfaces of pipes and devices that constitute the system, such as the steam generator 2, the low pressure heater 7 and the high pressure heater 8, i.e., surfaces of structural members which come into contact with non-deaerated water, are deposited with a protective substance by a conventionally known method. The structural member may be made of one or more of a steel material, a non-steel material, a nonferrous metal, or a weld metal corresponding to types or location of devices, machineries or like.

Examples of the protective substance include an oxide, a hydroxide, a carbonate compound, an acetic acid compound, and an oxalic acid compound of a metallic element selected out of Ti, Y, La, Zr, Fe, Ni, Pd, U, W, Cr, Zn, Co, Mn, Cu, Ag, Al, Mg, and Pb. Further, although one type of the protective substance may be formed on the pipes and various devices, the protective substance may be formed in combination of two or more types.

Figure 2:
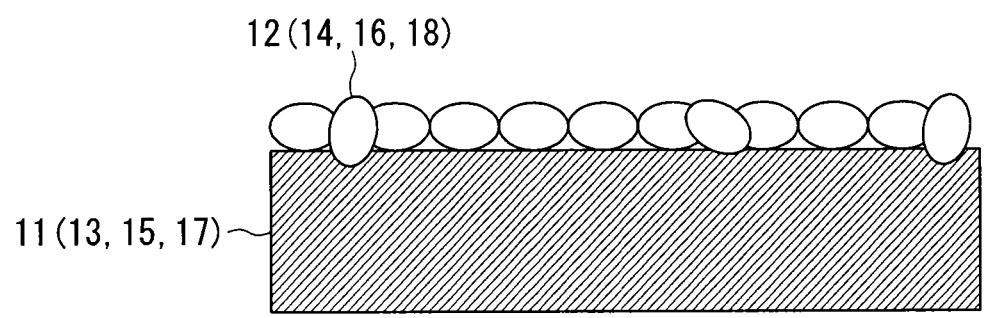
FIG. 2 is a concept view showing a deposit formed on a structural member according to the present embodiment.

For example, in the present embodiment, as shown in FIG. 2, the surface of the steam generator 17 is deposited with a titanium based protective substance (such as titanium oxide ($TiO_2$)) 18, the surface of a pipe 13 is deposited with a yttrium based protective substance 14 (such as yttria ($Y_2O_3$)), and the surface of the heater 15 is deposited with a lanthanum based protective substance 16 (such as lanthana ($La_2O_3$)). FIG. 2 is a concept view showing a protective substance 12 that is deposited on the surface of the structural member 11.

As a method for depositing with the protective substance 12, various publicly known methods may be used, such as depositing by spray and application, and depositing by bringing a fluid containing a protective substance into contact with the pipes and the devices.

Further, such depositing is suitably performed before a plant operation or at the time of periodical inspections depending on a degradation level of the deposit.
(Operation and Function)

As described in the foregoing, a deaerator disposed in a conventional secondary system is placed to deaerate circulating water in the system for the purpose of reducing transfer of oxygen to a steam generator. The deaerator performs a function of suppressing increase in corrosion potential in structural members by oxygen contribution.

Accordingly, if devices or equipment such as the steam generator including pipes would not be damaged by corrosion without deaeration processing applied to the circulating water in system water, it is not necessary to locate the deaerator itself, making it possible to achieve downsizing of equipment and reduction in equipment costs and running or operating costs.

Inventors of the present invention focused attention on this point and employed the above described constitution. As a result, it was newly found out that the deaerator in the secondary system which was conventionally needed could be saved.

More specifically, in the present embodiment, a protective substance that deposits the pipes and the devices of the secondary system serves as a barrier against oxygen diffusion in the water of the system, thereby reducing the amount of oxygen reaching the surface of the structural member. This reduction eliminates increase in corrosion potential by the oxygen contribution and makes it possible to keep the surface of the structural member at low voltage. As a result, it becomes possible to use non-deaerated water as circulating water of the system.

Hereinafter, effect confirmation tests performed on the protective substance of the present embodiment will be explained with reference to FIGS. 3 through 7.
(Effect Confirmation Test 1)

Figure 3:
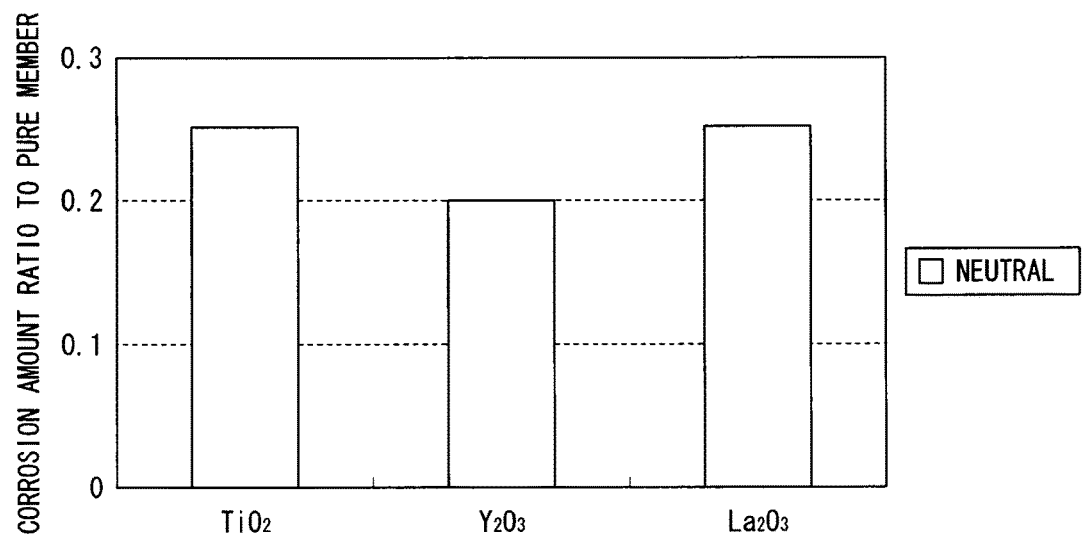
FIG. 3 is a view showing a corrosion amount ratio to a pure material in effect confirmation test 1 according to the present embodiment.

FIG. 3 is a view showing a corrosion amount ratio of structural members 11 of the present embodiment deposited with the protective substances 12 with respect to a structural member (pure material) not deposited with the protective substances.

As a result of a test conducted in neutral non-deaerated water of 180° C., considerable reduction in the corrosion amount was confirmed in all the structural members 11 deposited with respective protective substances 12 ($TiO_2$, $Y_2O_3$ and $La_2O_3$ in this example) as shown in FIG. 3.
(Effect Confirmation Test 2)

Figure 4:
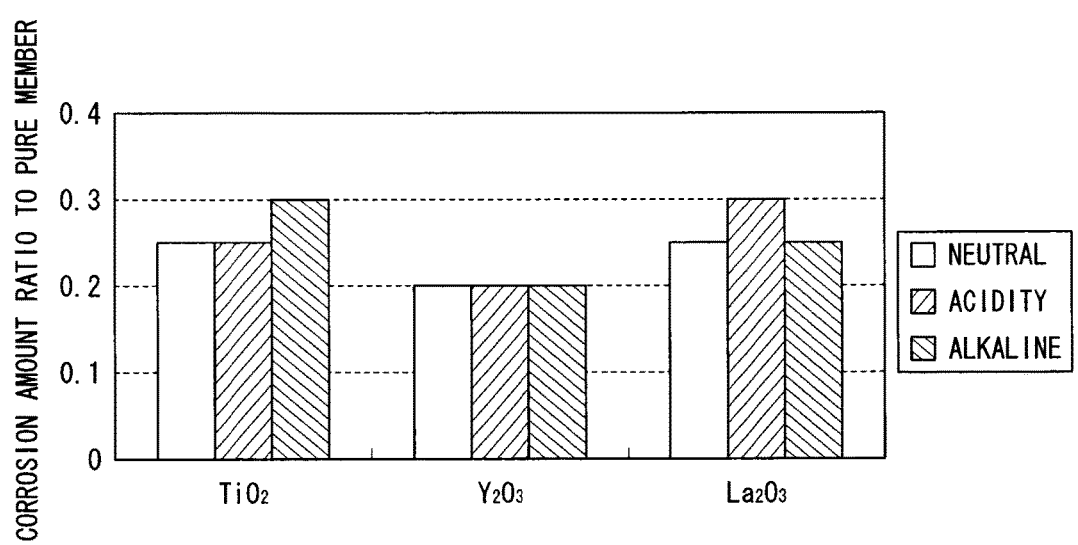
FIG. 4 is a view showing a corrosion amount ratio to the pure material in effect confirmation test 2 according to the present embodiment.

FIG. 4 is a view showing a corrosion amount ratio between a pure material and structural members 11 deposited with protective substances 12 of the present embodiment in the case of using high temperature hot water different in water quality (neutral, acid and alkaline).

FIG. 4 indicates that corrosion due to oxidation progressed in the pure material, whereas the structural members 11 deposited with the protective substances 12 of the present embodiment provided a corrosion suppressing effect regardless of water quality.
(Effect Confirmation Test 3)

Figure 5:
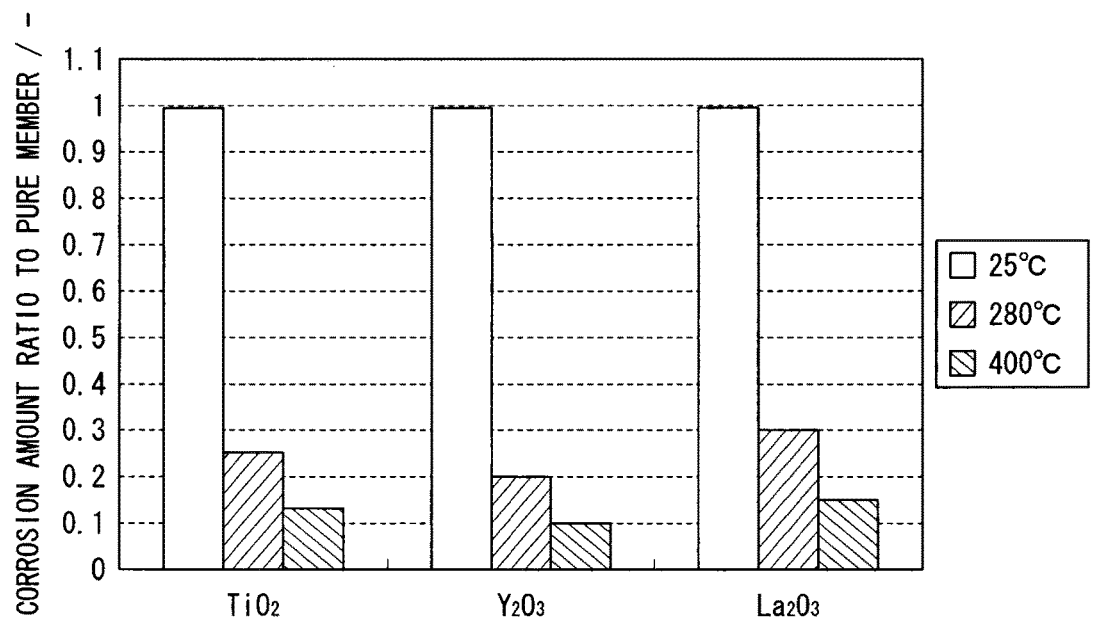
FIG. 5 is a view showing a corrosion amount ratio to the pure material in effect confirmation test 3 according to the present embodiment.

FIG. 5 is a view showing a corrosion amount ratio between a pure material and the structural members of the present embodiment in the case of varying temperatures of the system water.

FIG. 5 indicates that corrosion due to oxidation progressed in the general pure material, whereas the structural members deposited with the protective substances of the present embodiment provided a corrosion suppressing effect by the suppression of the oxygen diffusion. Furthermore, in a low temperature region, since the corrosion did not occur, a corrosion weight ratio to the pure material showed almost no change, whereas as the temperature increases, the oxidation reaction progressed and the corrosion amount increased. This fact indicates that a diffusion barrier function of the protective substances became stronger.

Thus, even under water quality conditions with the deaerator being saved, the corrosion suppressing effect by the protective substances becomes notable with a higher temperature. This effect is exhibited in the respective substances. Therefore, it is found that the protective substances of the present embodiment exhibit a remarkable corrosion suppressing effect at operating temperature of the plant.

(Effect Confirmation Test 4)

Figure 6:
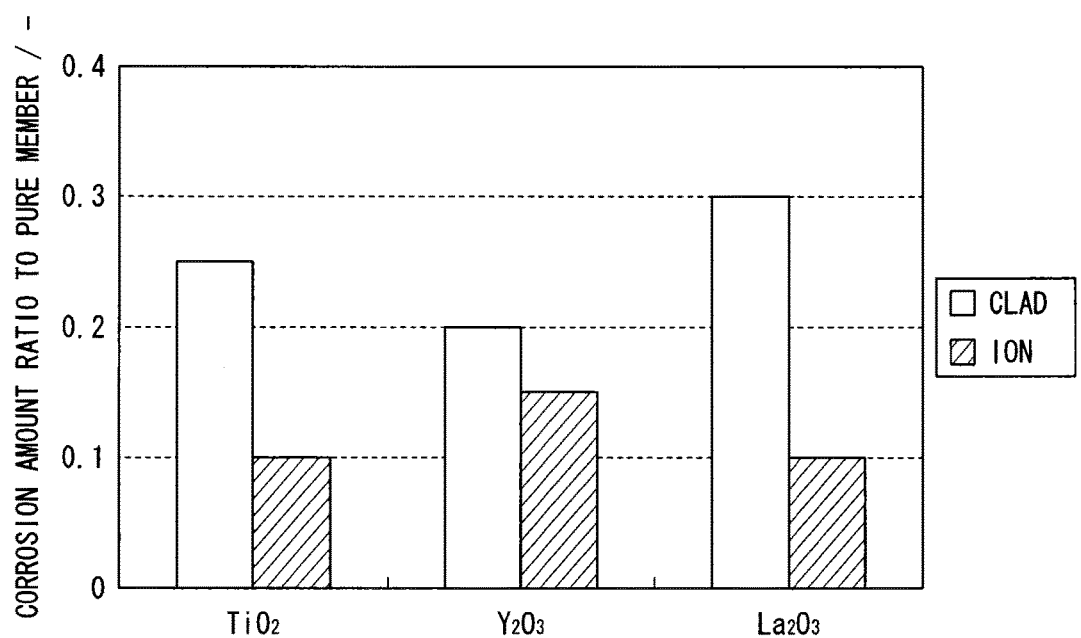
FIG. 6 is a view showing an adhering amount ratio to a pure material in effect confirmation test 4 according to the present embodiment.

FIG. 6 is a view showing an adhering amount ratio between a pure material and the structural members deposited with the protective substances of the present embodiment in the case where system water contains particulate clads or ions.

Generally, in adhesion of clads, zeta potential in clad particles contributes to the adhesion. General metal oxide takes a positive value in an acid region, reaches an isoelectric point (0) around a neutral region, and takes a negative value in an alkaline region. The Confirmation Test 4 was conducted under alkaline water conditions, and therefore, the clad provided a negative potential. The protective substances also had negative potential in the alkaline region. As a result, the protective substances had electrostatic repulsion with the clad. Since the corrosion potential on the surfaces of the structural members acted as an oxygen diffusion barrier because of the protective substances depositing the surfaces, a corrosion potential stabilizing action was also implemented.

As shown in FIG. 6, adhesion or crystallization of ions was notably influenced by the oxygen concentration on the surface of the members. That is, the oxygen concentration contributes to both the crystallization by the reaction between the ion and the oxygen, and by the variation in corrosion potential. The adhesion or crystallization of the ions is reduced by such an effect of suppressing oxygen from transferring to the surface of the structural member.

It is also known that roughness on the surface of the structural member affects the clad adhesion. Further, since the depositing of the protective substances fills the processing traces on the surface of the structural member, and hence, the surface becomes smooth. As a result, the adhesion of clads can be suppressed.

(Effect Confirmation Test 5)

Figure 7:
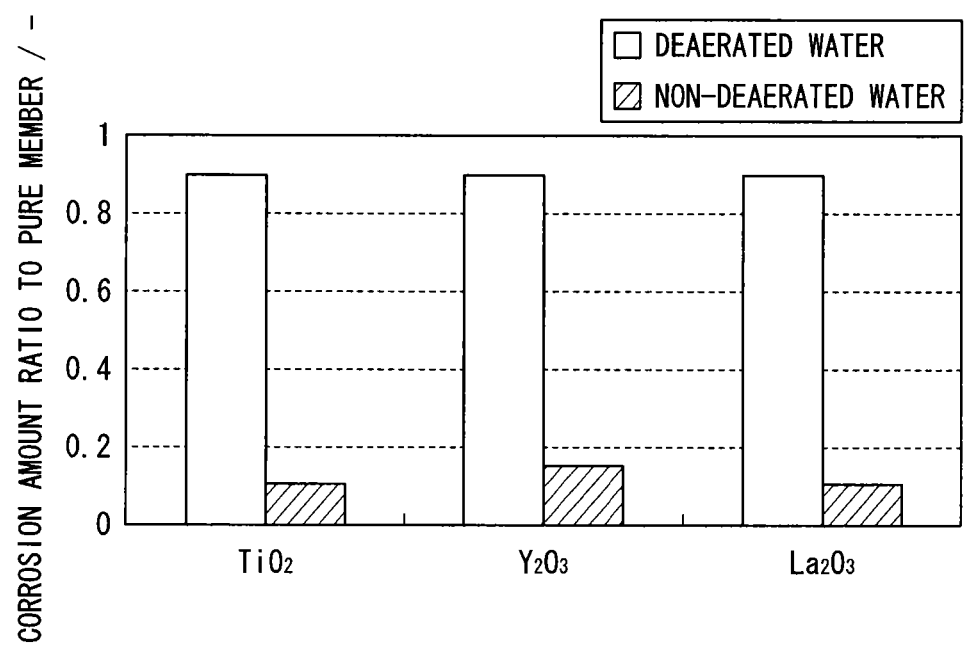
FIG. 7 is a view showing a corrosion amount ratio to the pure material in effect confirmation test 5 according to the present embodiment.

FIG. 7 is a view showing a corrosion amount ratio between a pure material and the structural members 11 deposited with the protective substances 12 of the present embodiment in the case of using deaerated water and non-deaerated water at a temperature of about 185° C. as the system water.

As shown in FIG. 7, the structural members 11 deposited with the protective substances 12 of the present embodiment do not attain a strong corrosion suppressing function in the case of using the deaerated water with a low dissolved oxygen concentration. On the other hand, it is indicated that the structural members 11 deposited with the protective substances 12 provide a remarkable corrosion suppressing effect in the case of non-deaerated water with a high dissolved oxygen concentration.

(Effect)

As can be understood from the above effect confirmation tests 1 to 5, the effect confirmation tests indicate that the protective substances of the present embodiment provide a remarkable corrosion suppressing effect in the system using non-deaerated water at a plant operation temperature. It is also indicated that the protective substances of the present embodiment provided a remarkable corrosion suppressing effect regardless of the water quality of the system water and regardless of the clads and ions contained in the system water.

Accordingly, as mentioned above, by forming a depositing of the protective substance according to the present embodiment on the surfaces of structural members of pipes and system devices, non-deaerated water can be used as system water. As a result, it becomes possible to save a deaerator and a chemical injection device or like.

The method for suppressing corrosion and the plant according to the present embodiment can achieve downsizing of the plant and reduction in equipment costs and can also eliminate the necessity of deaerator control, dissolved oxygen control in operation, and various chemical concentration control, so that the substantial reduction in running costs or operating costs can also be achieved.

It is to be noted that although examples of using $TiO_2$, $Y_2O_3$, and $La_2O_3$ as a protective substance have been explained in the present embodiment, the same operational effects can be obtained by using metallic elements other than those described hereinbefore. The same operational effects can also be obtained by using a hydroxide, a carbonate compound, an acetic acid compound, or an oxalic acid compound of the above metallic elements as a protective substance.

Furthermore, it is to be noted that although an example of applying the invention to a secondary system of a pressurized water nuclear power plant has been explained in the present embodiment, the present invention is not limited thereto, and is applicable to secondary systems of other plants such as fast reactors and to primary systems of thermal power generation plants.

REFERENCE NUMERALS

1 - - - nuclear reactor, 2 - - - steam generator, 3 - - - high pressure turbine, 4 - - - moisture content separation heater, 5 - - - low pressure turbine, 6 - - - condenser, 7 - - - low pressure heater, 8 - - - high pressure heater, 9 - - - high temperature desalting device, 10 - - - high temperature filter, 11 - - - structural member, 12 - - - protective deposit.

The invention claimed is:

1. A method for suppressing corrosion in a pressurized water nuclear plant comprising a secondary system, the secondary system comprising a steam generator, a turbine, a condenser, and a heater and not comprising a deaerator, the method comprising, in the following order:
   circulating water through the secondary system;
   depositing a protective substance on a surface of a structural member of the secondary system by spraying or by bringing a fluid comprising $TiO_2$ as the protective substance in contact with the surface of the structural member of the secondary system; and then
   circulating water through the secondary system such that the water contacts the protective substance, to make the protective substance into a single layer of $TiO_2$,
   wherein the protective substance consists of a single layer of $TiO_2$.

2. The method of claim 1, wherein the water is circulating water which is not subjected to chemical injection by a chemical injection device.

3. The method of claim 1, wherein the structural member of the secondary system having the protective substance is the steam generator.

4. The method of claim 1, wherein the structural member of the secondary system having the protective substance is the heater.

\* \* \* \* \*